United States Patent [19]

Zimmermann et al.

[11] 3,963,608
[45] June 15, 1976

[54] APPARATUS FOR THE TREATMENT OF SYNTHETIC RESIN POWDER

[75] Inventors: Adolf Zimmermann; Adolf Lesk; Walter Jordan, all of Osterburken; Rudi Baumann, Rosenberg, all of Germany

[73] Assignee: AZO-Maschinenfabrik Adolf Zimmermann, Germany

[22] Filed: July 30, 1974

[21] Appl. No.: 493,107

[30] Foreign Application Priority Data
July 31, 1973  Germany............................ 2338731

[52] U.S. Cl................................. 209/300; 209/247; 209/262; 308/36.3
[51] Int. Cl.²............................................ B07B 1/20
[58] Field of Search........... 209/238, 247, 262, 284, 209/300, 306, 273, 270, 296, 2; 222/195, 226; 308/187.1, 36.1, 36.3; 198/213; 260/2, 3; 427/345, 331

[56] References Cited
UNITED STATES PATENTS

| | | | |
|---|---|---|---|
| 1,320,684 | 11/1919 | Hackstedde | 209/247 |
| 2,523,259 | 9/1950 | Aber | 209/284 |
| 2,667,905 | 2/1954 | Tanner | 209/284 X |
| 2,714,045 | 7/1955 | Simenson | 308/36.3 |
| 3,679,278 | 7/1972 | Lucas | 308/187.1 |
| 3,693,842 | 9/1972 | Cozzarin et al. | 222/226 X |
| 3,695,427 | 10/1972 | Friesz | 209/44 |
| 3,837,717 | 9/1974 | Kipple et al. | 308/36.3 |

FOREIGN PATENTS OR APPLICATIONS

| | | | |
|---|---|---|---|
| 78,355 | 3/1933 | Sweden | 209/284 |

*Primary Examiner*—Frank W. Lutter
*Assistant Examiner*—Ralph J. Hill
*Attorney, Agent, or Firm*—Craig & Antonelli

[57] ABSTRACT

An apparatus for the treatment of synthetic resin powder, such as an epoxy resin or polyester resin powder that forms an excess of powder when used for coating surfaces. The apparatus has a substantially horizontal and cylindrical screen mounted in a housing with an outside discharge for material passing through the screen from its interior and a rotor for rotating inside the screen. The rotor comprises at least two bars spaced and generally parallel with the inside of the screen and is rotatable in the housing on the bearings which are open towards the screen and are connected to a supply of fluid under pressure.

16 Claims, 1 Drawing Figure

U.S. Patent June 15, 1976 3,963,608
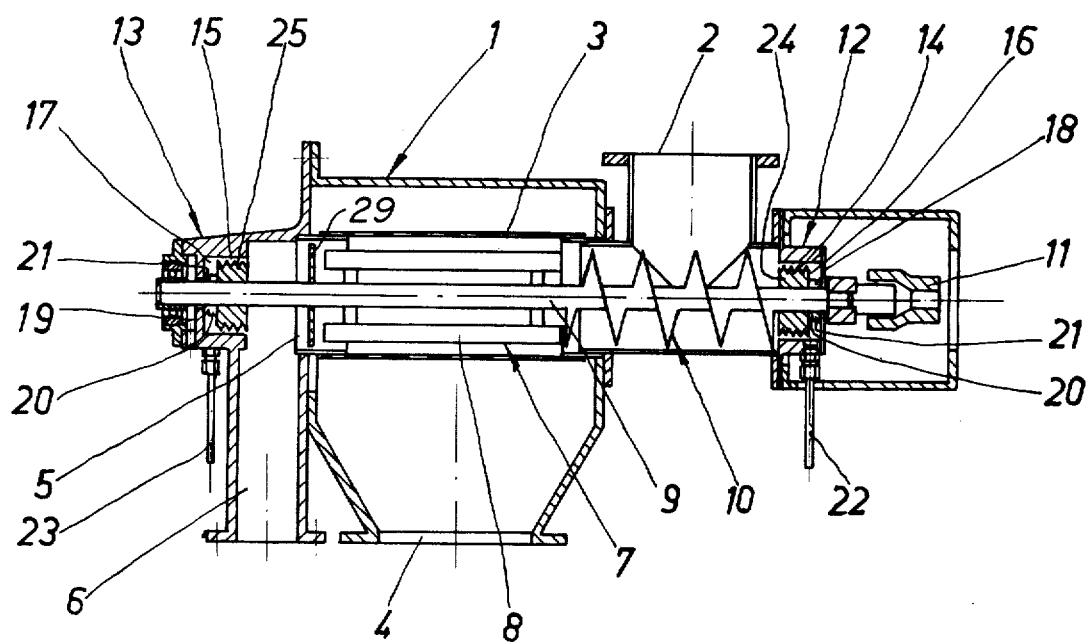

APPARATUS FOR THE TREATMENT OF SYNTHETIC RESIN POWDER

This invention relates to an apparatus for the treatment of synthetic resin powders, e.g. those of polyester resins or epoxy resins, which occur as excess powder when surfaces are being coated with the resin.

In the lacquer or coating art, synthetic resin powders are being widely used at the present time, these powders being applied to the surfaces which are to be coated, either by dipping or spraying. The invention is more particularly concerned with powder coating in which a dry powder is sprayed onto the surface. By using heat, the epoxy or polyester resin powder melts and flows to form a smooth, clean lacquer coating. The heat which is necessary for this melting operation can be supplied in various ways. By way of example, the workpiece with the electrostatically adhering powder can be heated in an oven or it is even possible for the already pre-heated workpiece to be coated with the powder. It is, in addition, known to immerse the heated workpiece in a bath in which the powder is held in suspension.

More especially when the powder is sprayed onto the surface to be coated, it is necessary to use approximately twice the quantity of the powder which is actually required for the coating, so as finally to obtain a satisfactory surface. The excess powder either does not even reach the surface or falls off the surface. On the floor, it becomes mixed with particles of dirt which are present and as a consequence cannot easily be used again. Reuse is, however, desirable, for the reason that the resins used are relatively costly.

The invention has for one of its objects to provide an apparatus by means of which it is possible for soiled or contaminated excess powder to be treated mechanically and to be once again supplied to the coating process.

This object can be achieved, according to one aspect of the invention, by the use of a generally cylindrical screen which is arranged, preferably horizontally, in a housing having an outlet near its periphery for the discharge of powder which has passed through the screen and a rotor which revolves in the interior of the screen and which comprises at least two bars extending in generally parallel relation spaced from the cylindrical screen, the bearings carrying the rotor in the housing being open towards the screen and being connected to a supply of fluid which is under pressure.

The excess powder is supplied to the apparatus through an entry opening into the housing and it may be transported by means of a conveyor worm or the like into the space inside the cylindrical screen. In the space, it is taken up by the revolving rotor and forced against the cylindrical wall of the screen. The mesh size of the screen is adjusted to match the maximum grain size of the epoxy resin powder, so that it is only this latter which passes through the screen. All larger particles, whether these particles are dirt or even caked resin particles which cannot be used for the spraying operation, are collected as screen residue at the open end of the cylindrical screen. This arrangement certainly does not exclude the possibility of small particles of dirt also passing through the screen, but the size of such particles is so small that they would have little or no appreciable influence on the quality of the coating at the time of spraying onto the surface.

Conventional cylindrical screens having an internally rotating rotor, which are known per se for other purposes cannot be used for the treatment of epoxy resin powder, since the epoxy resin is at least superficially melted wherever friction occurs, i.e., more particularly at the bearings; as a result of which the resin grains cake together or even stick to moving parts or to one another. By the feature of the invention according to which the housing bearings are designed so that they are open towards the cylindrical screen and by the introduction into the bearing gaps of a medium under pressure, e.g. compressed air, which flows through the gaps into the cylindrical screen, there is firstly obtained a continuous cooling at the points where friction is likely to occur and secondly any epoxy resin powder is prevented from passing between the moving parts.

In a preferred constructional form of the invention, the housing bearings of the rotor have on their sides remote from the cylindrical screen resilient discs for sealing off the bearing gaps existing at these points under the action of pressure.

Even although the bearing gap or gaps could themselves be open, provision can be made in a simpler manner by the invention firstly for the fluid under pressure only to be able to expand towards the screen, and secondly for the pressure to be reduced according to the demand for it.

The or each resilient disc is with advantage arranged in a rearward cavity of the housing bearing, and comprises a highly elastic annular lip which encloses the bearing gap.

Under the action of the fluid pressure, the readily deformable annular lip is pressed with a sealing action either onto the driving shaft or even onto the coacting part of the housing bearing. The pressurized medium (fluid) is for this purpose fed into the rearward cavity of the housing bearing.

In a preferred construction, the disc comprises a hub which carries the highly resilient annular lip but which is less resilient as compared with said lip, which hub is fitted onto the shaft of the rotor, while the annular lip bears against a rearward closure wall of the bearing, said wall having a passage for the shaft. The disc thus revolves with the rotor shaft, the annular lip rubbing against the closure wall of the bearing.

According to another feature of the invention, that gap between the housing bearing and rotor shaft which is open towards the cylindrical screen includes a labyrinth. In this way, any penetration of epoxy resin powder into the bearing gap is also substantially avoided in a mechanical way. The labyrinth is preferably formed by a threaded ring the pitch of which is, for example, so arranged that there is a conveying effect in the direction towards the cylindrical screen. In this way, the action of the compressed air for avoiding the penetration of epoxy resin powder is also further assisted.

The invention will now be described with reference to a preferred constructional form which is shown in the accompanying drawing.

The apparatus, which is shown in axial section, comprises a housing 1 with an entry opening 2 for an epoxy resin powder. Fixedly arranged in the housing 1 is a cylindrical screen 3, the mesh size of which is adapted to the maximum grain size of the epoxy resin powder. The epoxy resin powder thus passes as a powder through the cylindrical screen 3, and emerges peripherally from it. For discharge of the material passing through the screen 3, the housing 1 has a discharge opening 4.

As can be seen from the drawing, the cylindrical screen 3 is open at both ends. The material which is caught by the screen accumulates at its forward end 5, this residue dropping through an outlet 6 of the housing 1. A baffle plate 29 is provided at the forward end 5 for retaining product for a certain time.

Revolving inside the cylindrical screen 3 is a rotor which is generally indicated at 7 and which comprises two or more bars 8 arranged substantially axially and parallel to each other at a certain distance from the screen 3. The rotor 7 is mounted on a driving shaft 9 which, in the constructional example illustrated, includes in the region of the entry opening 2 of the housing 1, a screw conveyor 10 by means of which the epoxy resin powder which is supplied to the apparatus is carried into the cylindrical screen 3. In the latter, it is taken up by the rotor bars and centrifugally accelerated, it being ensured by the spacing between the bars 8 and the cylindrical screen 3 that there is no comminution effect.

The driving shaft 9 is driven through a clutch 11 by a motor (not shown). It is mounted in bearings 12 and 13 in the housing, one being in the region of the clutch and the other being near the other end of the shaft. The bearings 12 and 13 intentionally have gaps 14 and 15 which are somewhat larger than the shaft. In addition, they have in their rearward regions cavities 16 and 17, which are limited by rearward closure walls 18 and 19. Arranged in each of these cavities is a disc which consists of a hub 20 having relatively low flexibility and a highly resilient annular lip 21 which is formed or mounted on the hub. Each disc is fitted with its hub 20 on the driving shaft 9, while its resilient annular lip 21 bears against the wall 18 or 19.

Connected to each of the bearings 12 and 13 is a pressure line 22 and 23, respectively, through which a medium under pressure, e.g. compressed air, is fed into the cavities 16 and 17. This pressurized medium forces the annular lips 21 against the walls 18 and 19 and escapes through the bearing gaps 14 and 15 in the direction of the cylindrical screen 3 and into the housing 1. The bearing gaps 14 and 15 are consequently always traversed by the mediums in the directions of the screen 3.

Each of the bearing gaps can in addition also include a labyrinth. In the construction illustrated, a ring 24 or 25 is mounted on the driving shaft 9, these rings being provided externally with screw threads. The thread pitch is in this case advantageously so chosen that, as the driving shaft 9 rotates, there is a conveying effect in the direction of the interior of the housing. The two rings 24 and 25 consequently have opposite screw threads.

While the novel embodiments of the invention have been described, it will be understood that various omissions, modifications and changes in these embodiments may be made by one skilled in the art without departing from the spirit and scope of the invention.

What is claimed is:

1. Apparatus for reclaiming synthetic resin powder contaminated with foreign matter, said apparatus comprising a substantially horizontal and cylindrical screen, housing means housing said screen and defining a discharge opening for synthetic resin powder passing through said screen, feeding means for feeding contaminated synthetic resin powder to the interior of said screen, recovery means for withdrawing foreign matter too large to fit through said screen from the interior of said screen, rotor means in said screen comprising at least two spaced and generally parallel bars connected to a shaft, bearing means mounting said rotor means for rotation in said screen, said bearing means including fluid seal means for preventing synthetic resin powder from coming into contact with engaging parts of said bearing means by the flow of a fluid, and a resilient disc mounted on said shaft, said bearing means constructed so that fluid from said fluid seal means (a) flows away from engaging parts of said bearing means so that synthetic resin powder is blown away from said engaging parts and (b) acts on said resilient disc to seal off any communication between the interior of said screen and the engaging parts of said bearing means.

2. The apparatus of claim 1, wherein said shaft engages said bearing means, said fluid seal including an annular gap defined on the inside by said shaft and on the outside by a stationary portion of said bearing means, the only path by which synthetic resin powder can reach engaging parts of said bearing means being through said gap, said fluid seal further comprising means for connecting said gap to a source of fluid under pressure for flowing fluid through said gap towards said screen.

3. The apparatus of claim 2, wherein said annular gap opens towards said screen.

4. The apparatus of claim 2 further comprising a labyrinth mounted on said shaft and positioned in said gap.

5. The apparatus of claim 4, wherein said labyrinth is a threaded ring defining on its outside annular surface a helical thread arranged so that any synthetic resin powder in said annular gap is conveyed toward said screen.

6. The apparatus of claim 1, wherein said feeding means is composed of a helical screw arranged on said shaft.

7. The apparatus of claim 6, wherein said recovery means comprises a downwardly opened conduit arranged on an opposite side of said screen from said feeding means.

8. The apparatus of claim 1, wherein said recovery means is located on an opposite side of said screen from said feeding means.

9. The apparatus of claim 1, wherein both ends of said shaft are mounted with bearing means including said fluid sealing means and an associated resilient disc.

10. Apparatus for reclaiming synthetic resin powder contaminated with foreign matter, said apparatus comprising a substantially horizontal and cylindrical screen, housing means housing said screen and defining a discharge opening for synthetic resin powder passing through said screen, feeding means for feeding contaminated synthetic resin powder to the interior of said screen, recovery means for withdrawing foreign matter too large to fit through said screen from the interior of said screen, rotor means in said screen comprising at least two spaced and generally parallel bars connected to a shaft and bearing means engaging said shaft for mounting said rotor means for rotation in said screen, said bearing means including a stationary closure wall defining with said shaft an annular space, said bearing means further defining with said shaft an annular gap opening toward said screen, the only path by which synthetic resin powder can reach engaging parts of said bearing means being through said gap, said apparatus further comprising means for connecting said annular gap to a source of fluid under pressure for flowing fluid through said gap toward said screen and a resilient disc on said shaft and in said annular gap, said resilient disc shaped such that said resilient disc and said stationary closure wall seal off said annular space when acted upon by the pressure of the fluid from said fluid source.

11. The apparatus of claim 10, wherein said resilient disc includes an elastic annular lip for sealing said annular space.

12. The apparatus of claim 11, wherein said resilient disc includes a resilient core carrying said elastic annular lip, said core being less resilient than said lip, said core being mounted on said shaft.

13. The apparatus of claim 12 further comprising a labyrinth mounted on said shaft and positioned in said gap.

14. The apparatus of claim 13, wherein said labyrinth is a threaded ring defining on its outside annular surface a helical thread arranged so that any synthetic resin powder in said annular gap is conveyed toward said screen.

15. The apparatus of claim 11 further comprising a labyrinth mounted on said shaft and positioned in said gap.

16. The apparatus of claim 15, wherein said labyrinth is a threaded ring defining on its outside annular surface a helical thread arranged so that any synthetic resin powder in said annular gap is conveyed toward said screen.

* * * * *